(12) United States Patent
Itakura (10) Patent No.: US 10,194,130 B2
(45) Date of Patent: Jan. 29, 2019

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Kina Itakura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 15/092,096

(22) Filed: Apr. 6, 2016

(65) Prior Publication Data

US 2016/0301908 A1    Oct. 13, 2016

(30) Foreign Application Priority Data

Apr. 9, 2015  (JP) ................................ 2015-080440

(51) Int. Cl.

| | |
|---|---|
| *G06T 5/00* | (2006.01) |
| *H04N 13/111* | (2018.01) |
| *G06T 5/40* | (2006.01) |
| *G06T 5/50* | (2006.01) |
| *H04N 13/243* | (2018.01) |
| *H04N 13/00* | (2018.01) |

(52) U.S. Cl.
CPC ............ *H04N 13/111* (2018.05); *G06T 5/002* (2013.01); *G06T 5/40* (2013.01); *G06T 5/50* (2013.01); *H04N 13/243* (2018.05); *G06T 2207/10004* (2013.01); *G06T 2207/10028* (2013.01); *H04N 2013/0081* (2013.01)

(58) Field of Classification Search
CPC .................. G06T 2207/10028; H04N 13/0011
See application file for complete search history.

(56) References Cited

U.S. PATENT DOCUMENTS

| | | | | |
|---|---|---|---|---|
| 2009/0244263 | A1* | 10/2009 | Saito ........................ | G01C 3/08 348/47 |
| 2011/0044531 | A1* | 2/2011 | Zhang ................ | H04N 13/0022 382/154 |
| 2013/0278596 | A1* | 10/2013 | Wu ......................... | G06T 15/00 345/419 |
| 2016/0301908 | A1* | 10/2016 | Itakura ................ | H04N 13/0011 |
| 2018/0089523 | A1* | 3/2018 | Itakura .................... | G06T 7/194 |
| 2018/0098047 | A1* | 4/2018 | Itakura ...................... | G06T 7/62 |

FOREIGN PATENT DOCUMENTS

JP    2013-225740 A    10/2013

\* cited by examiner

*Primary Examiner* — Gandhi Thirugnanam
(74) *Attorney, Agent, or Firm* — Canon U.S.A. Inc. IP Division (57) ABSTRACT

An image processing apparatus includes an image obtaining unit configured to obtain an image including an object, a distance obtaining unit configured to obtain distance information indicating an object distance corresponding to each pixel in the image, each pixel having a pixel value to be combined with the object distance thereof into a combination, a determination unit configured to determine a correction target pixel subjected to correction of the distance information based on the combination of each pixel in image with the combinations of the other pixels, and a correction unit configured to correct the distance information of the correction target pixel determined by the determination unit.

11 Claims, 10 Drawing Sheets

IMAGE PROCESSING APPARATUS, IMAGE PROCESSING METHOD, AND PROGRAM

BACKGROUND

Field of the Disclosure

The present disclosure relates to processing for generating an image viewed from a virtual viewpoint.

Description of the Related Art

Techniques have been discussed which use a plurality of image data pieces of the same scene captured from a plurality of different viewpoints to generate image data (hereinbelow, referred to as virtual viewpoint image data) viewed from a viewpoint (hereinbelow, referred to as a virtual viewpoint) different from the viewpoints used to capture the image. As example of a method for generating virtual viewpoint image data, there is a technique for estimating a pixel value of the virtual viewpoint image data using image data obtained by image capturing and a depth map indicating distance information of an object corresponding to each pixel of the image data. However, it is difficult to accurately obtain a depth map corresponding to image data, and especially at a boundary portion where an object is changed, a depth map of which distance information is incorrect is obtained in some cases. If virtual viewpoint image data is generated using such a depth map, an artifact is generated in the generated virtual viewpoint image data.

As a method for resolving the above-described issue, Japanese Patent Application Laid-Open No. 2013-225740 discusses a technique for generating high quality virtual viewpoint image data by correcting a depth map based on contours of an object respectively extracted from image data and the depth map using the image data as a reference.

However, the technique discussed in Japanese Patent Application Laid-Open No. 2013-225740 has an issue that if the distance information is erroneously estimated in a region distant from the contour of the object, the error cannot be corrected since the depth map is corrected based on the contour of the object.

SUMMARY

The present invention is directed to improvement in accuracy of distance information in a region near a contour of an object and also in a region distant from the contour of the object so as to resolve the above-described issue.

An image processing apparatus according to the present invention includes an image obtaining unit configured to obtain an image including an object, a distance obtaining unit configured to obtain distance information indicating an object distance corresponding to each pixel in the image, the image data of each pixel having a pixel value to be combined with a distance object into a combination; a determination unit configured to determine a correction target pixel subjected to correction of the distance information based on a comparison of the combination of each pixel and the combinations of the other pixels, and a correction unit configured to correct the distance information of the correction target pixel determined by the determination unit.

Further features of the present invention will become apparent from the following description of exemplary embodiments with reference to the attached drawings.

DESCRIPTION OF THE EMBODIMENTS

Various exemplary embodiments of the present invention are described below with reference to the attached drawings. It is noted that the below described exemplary embodiments are not meant to limit the scope of the present invention as encompassed by the appended claims. Further, not all combinations of features described in the present exemplary embodiments are essential for solving means of the present invention. The same configurations are denoted by the same reference numerals.

According to a first exemplary embodiment, it is described a method for obtaining a high quality depth map by detecting a pixel including an abnormal combination from among combinations of a pixel value and an object distance of each pixel and correcting the depth map with respect to the detected pixel. Further, a method for generating a high quality virtual viewpoint image using the obtained high quality depth map is also described.

Figure 1:
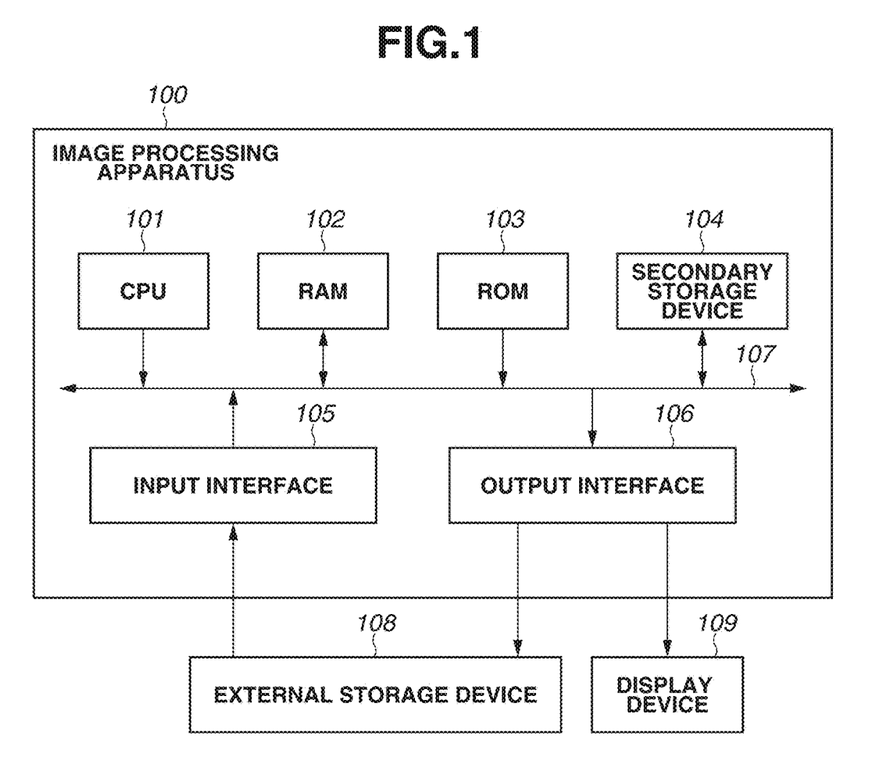
FIG. 1 is a block diagram illustrating a configuration of an image processing apparatus according to a first exemplary embodiment.

FIG. 1 illustrates an example of a configuration of an image processing apparatus according to the first exemplary embodiment. An image processing apparatus 100 (hereinbelow, referred to as the processing apparatus 100) according to the first exemplary embodiment includes a central processing unit (CPU) 101, a random access memory (RAM) 102, a read-only memory (ROM) 103, a secondary storage device 104, an input interface 105, and an output interface 106. Each configuration unit in the processing apparatus 100 is connected to each other by a system bus 107. Further, the processing apparatus 100 is connected to an external storage device 108 via the input interface 105 and connected to the external storage device 108 and a display device 109 via the output interface 106.

The CPU 101 is a processor which executes a program stored in the ROM 103 using the RAM 102 as a work memory and comprehensively controls each configuration unit in the processing apparatus 100 via the system bus 107. Accordingly, various types of processing described below are executed.

The secondary storage device 104 is a storage device for storing various types of data handled in the processing apparatus 100, and according to the present exemplary embodiment, a hard disk drive (HDD) is used. The CPU 101 can write data to the secondary storage device 104 and read data stored in the secondary storage device 104 via the system bus 107. In addition to the HDD, various storage devices, such as an optical disk and a flash memory, can be used as the secondary storage device 104.

The input interface 105 is a serial bus interface of, for example, a universal serial bus (USB) and an Institute of Electrical and Electronics Engineers (IEEE) 1394, and an input of data, a command, and the like from an external device to the processing apparatus 100 is performed via the input interface 105. The processing apparatus 100 obtains data from the external storage device 108 (a storage medium such as a hard disk, a memory card, a compact flash (CF) card, a secure digital (SD) card, and a USB memory) via the input interface 105. The input interface 105 can be connected to an input device such as a mouse and a button, which are not illustrated, and a user sets a viewpoint of virtual viewpoint image data using the input device. The output interface 106 includes a serial bus interface of USB, IEEE 1394, and the like, similar to the input interface 105. In addition, a video output terminal, such as a digital visual interface (DVI) and a high-definition multimedia interface (HDMI, a registered trademark) can be used. An output of data and the like from the processing apparatus 100 to the external device is performed via the output interface 106. The processing apparatus 100 outputs a processed image and the like to the display device 109 (various image display devices such as a liquid crystal display) via the output interface 106 to display an image. There are constituent elements of the processing apparatus 100 other than ones described above, however, they are not the essence of the present invention, and thus the descriptions thereof are omitted.

Figure 2:
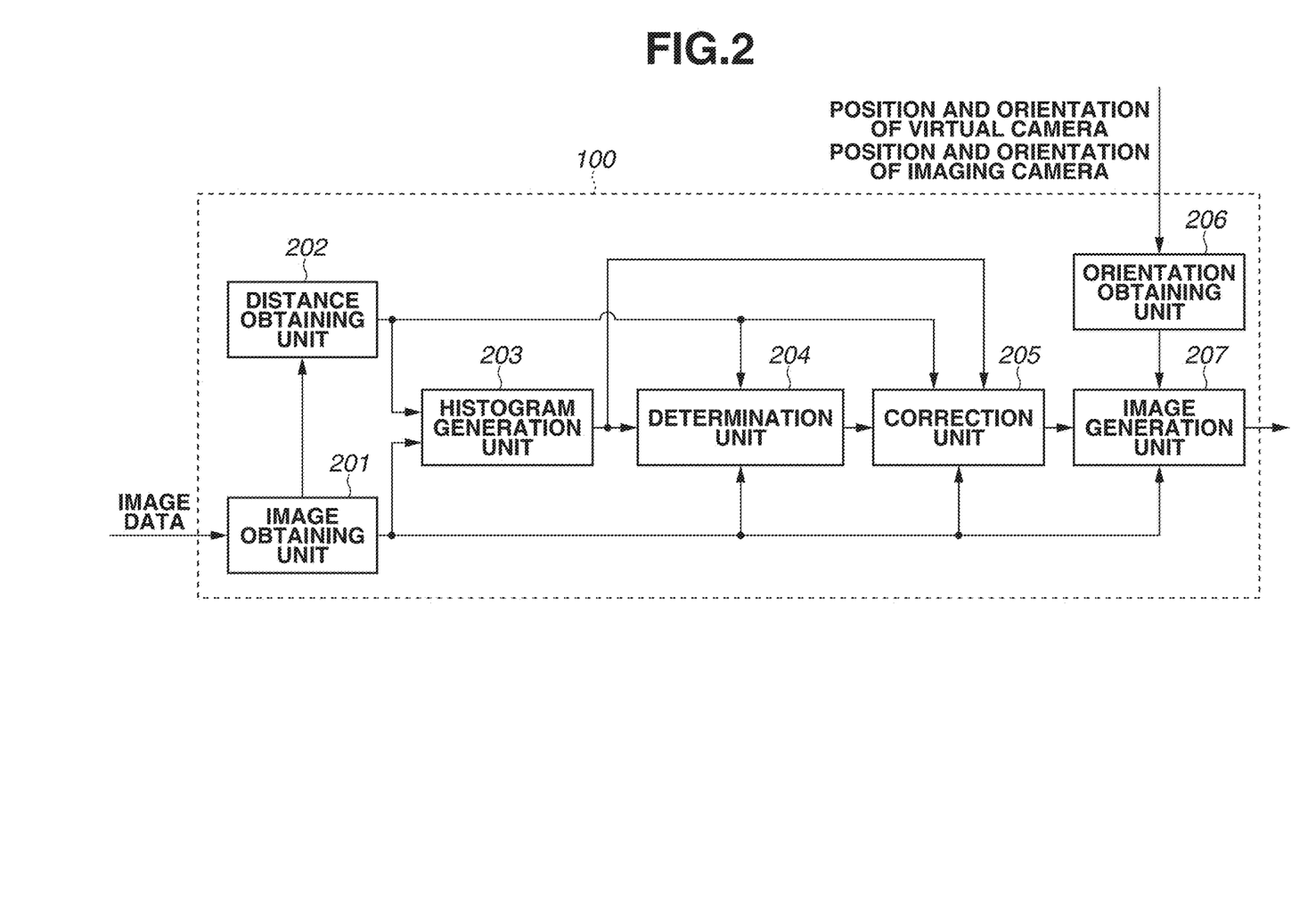
FIG. 2 is a block diagram illustrating a function configuration of the image processing apparatus according to the first exemplary embodiment.

Processing performed in the processing apparatus 100 according to the first exemplary embodiment is described below with reference to FIGS. 2 and 3. FIG. 2 is a block diagram illustrating a function configuration of the processing apparatus 100. The CPU 101 executes a program stored in the ROM 103 using the RAM 102 as a work memory, so that the processing apparatus 100 functions as each configuration unit illustrated in FIG. 2 and executes a series of processing illustrated in a flowchart in FIG. 3. In this regard, the CPU 101 is not required to execute all of the processing described below, and the processing apparatus 100 may be configured to execute a part or all of the processing by one or a plurality of processing circuits other than the CPU 101. A flow of the processing executed by each configuration unit is described below.

In step S301, an image obtaining unit 201 obtains image data to be a processing target via the input interface 105 or from the secondary storage device 104. The image data to be obtained here is multi-viewpoint image data indicating a plurality of images obtained by capturing images of a same object from a plurality of different viewpoints at the same time using a multi-viewpoint imaging apparatus, such as a camera array. The image obtaining unit 201 outputs the obtained image data to a distance obtaining unit 202, a histogram generation unit 203, a determination unit 204, a correction unit 205, and an image generation unit 207.

In step S302, the distance obtaining unit 202 obtains distance information indicating a distance from the imaging apparatus which captured the image data to the object included in the image data for each viewpoint using the image data input from the image obtaining unit 201. According to the present exemplary embodiment, the distance obtaining unit 202 performs stereo matching among a plurality of images from different viewpoints included in the image data, and thus estimates and obtains a depth map storing a distance corresponding to each pixel in the image as the distance information. A method for obtaining the distance information is not limited to the above-described one. For example, a depth map may be obtained by reading a depth map which is obtained in advance by a distance sensor, such as an infrared sensor, from the secondary storage device 104 and the external storage device 108. The distance obtaining unit 202 outputs the obtained depth map to the histogram generation unit 203, the determination unit 204, and the correction unit 205.

In step S303, the histogram generation unit 203 generates a histogram distribution of pixel values and object distances based on the image data input from the image obtaining unit 201 and the depth map input from the distance obtaining unit 202. The histogram distribution is generated for each viewpoint using the image data and the depth map of the same viewpoint, so that the histogram generation unit 203 independently performs the processing for each viewpoint.

Figure 4:
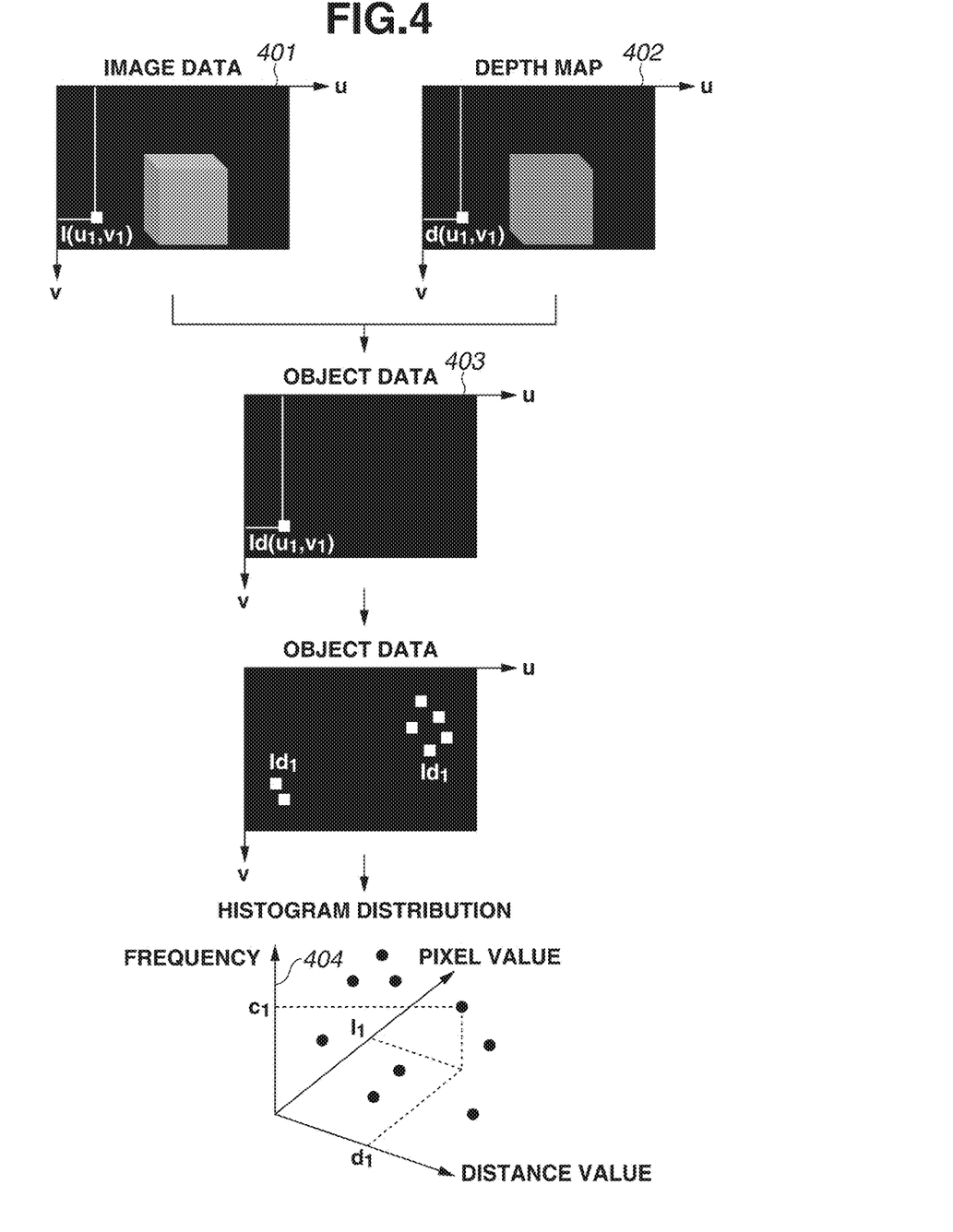
FIG. 4 illustrates a concept of processing by a histogram generation unit 203 according to the first exemplary embodiment.

Generation of the histogram distribution is described with reference to FIG. 4. A histogram distribution 404 is formed by counting frequencies of two values, i.e., a pixel value $I(u_1, v_1)$ of image data 401 and a distance value $d(u_1, v_1)$ of a depth map 402 regarding a same pixel position $(u_1, v_1)$ in the image data 401 and the depth map 402. The histogram distribution 404 is generated using object data 403 storing the values I and d of each pixel. Data included in the object data 403 is defines as a pair value $Id(u_1, v_1) = I(u_1, v_1), d(u_1, v_1))$. The histogram generation unit 203 counts the number $c_1$ of the pixels having the same pair value $Id_1 = (I_1, d_1)$ in the object data, regards the counted pixel numbers as a frequency, and plots each pair value in a multidimensional space 404 constituted of the pixel value, the distance value, and the frequency as respective axes. According to the present exemplary embodiment, a three-dimensional space using luminance of each pixel as a pixel value is described, however, if an image input from the image obtaining unit 201 is a red-green-blue (RGB) three channel color image and the like, a four or more multidimensional space may be used. The histogram generation unit 203 outputs a plotting result of all the pair values to the determination unit 204 as the histogram distribution.

Figure 3:
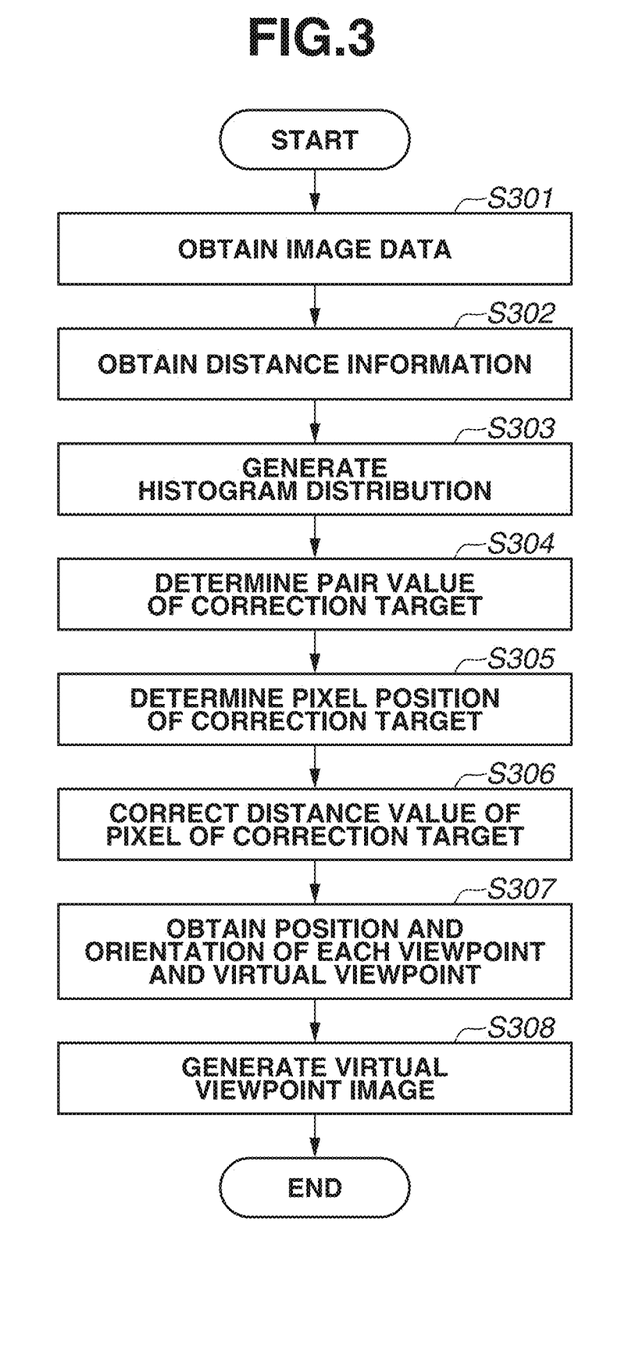
FIG. 3 is a flowchart illustrating a processing flow by the image processing apparatus according to the first exemplary embodiment.

Now, returning to the description of the flowchart in FIG. 3. In step S304, the determination unit 204 determines a pair value to be a correction target based on the histogram distribution obtained from the histogram generation unit 203. Generally, a region in which pixel values are similar to one another in an object existing on a same distance has a certain extent. Thus, a pair value which is a combination of a pixel value and an object distance is similar to one another in many pixels in an image. When the number of pixels including similar pair values are extremely low, it is highly likely that the pair value is false due to an error in distance estimation and the like, and the pair value is regarded as an abnormal pair value. Thus, the determination unit 204 regards a pair value having a frequency equal to or less than a threshold value as a correction target in the histogram distribution indicating the frequency of the pair value. In other words, it is equivalent to detecting a pair value having a frequency equal to or less than a threshold value as an abnormal pair value as a result of comparison of pair values in each pixel and regarding the pixel including the abnormal pair value as a correction target. The threshold value used here can be determined based on a total number of pixels in an image and the like. For example, according to the present exemplary embodiment, $1/10000$ of the total number of pixels is set as a threshold value. The threshold value does not have to be one value and may be adaptively changed for a range determined from a distance value and a pixel value.

Figure 5:
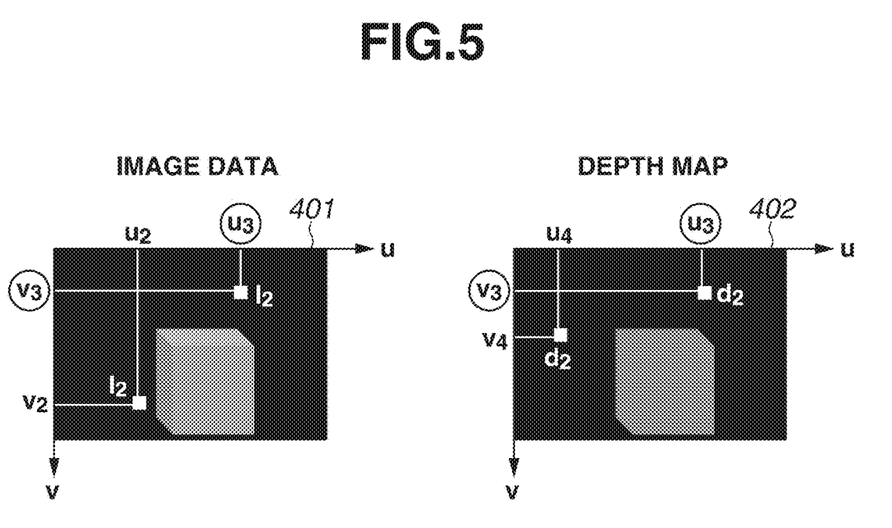
FIG. 5 illustrates a concept of processing by a determination unit 204 according to the first exemplary embodiment.

In step S305, the determination unit 204 determines a position of a pixel to be a correction target at the distance information based on the pair value determined as the correction target in step S304. Processing for determining the pixel position of the correction target described with reference to FIG. 5. When the pair value determined as the correction target in step S304 is $Id_2=(I_2, d_2)$, the determination unit 204 detects a position of a pixel having a pixel value of $I_2$ from the image data 401 input from the image obtaining unit 201. In the example in FIG. 5, pixel positions $(u_2, v_2)$ and $(u_3, v_3)$ are detected. Next, the determination unit 204 detects a position of a pixel having a distance value $d_2$ from the depth map 402 input from the distance obtaining unit 202. In the example in FIG. 5, pixel positions $(u_3,$ and $v_3)$ are detected. Subsequently, the determination unit 204 determines the pixel position which is detected in both of the detection based on the pixel value $I_2$ and the detection based on the distance value $d_2$ as described above as the pixel position having the pair value of the correction target, namely the pixel position of the correction target. In the example in FIG. 5, the pixel position $(u_3, v_3)$ is determined as the pixel position of the correction target. The determination unit 204 outputs the pixel position of the correction target determined here to the correction unit 205. In this regard, the pixel position of the correction target to be determined for one pair value is not necessarily on and when a plurality of pixel positions is detected, the determination unit 204 outputs the plurality of pixel positions to the correction unit 205.

In step S306, the correction unit 205 corrects the depth map input from the distance obtaining unit 202 using the image data input from the image obtaining unit 201, the histogram distribution input from the histogram generation unit 203, and the pixel position input from the determination unit 204. According to the present exemplary embodiment, the correction unit 205 corrects the depth map by replacing a distance value of the pixel position of the correction target with a distance value of another pixel. A processing method for correcting a depth map is specifically described below with reference to FIGS. 6A and 6B.

Figure 6A:
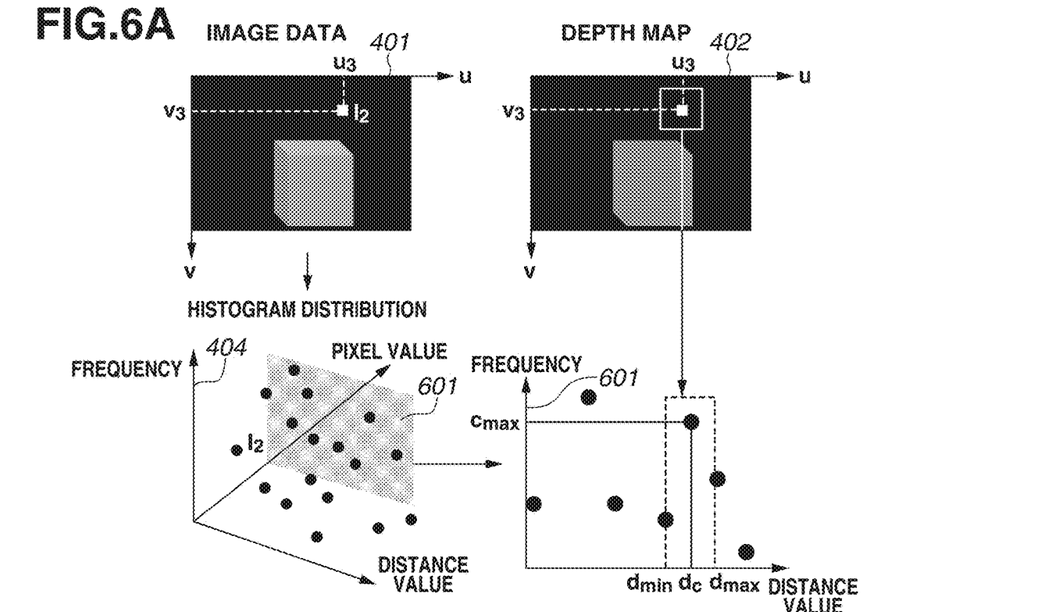
FIGS. 6A and 6B illustrate a concept of processing by a correction unit 205 according to the first exemplary embodiment.

FIG. 6A illustrates an example to determine a distance value used for replacement using a pixel value of a pixel to be a correction target as a reference. A plane 601 is a plane which corresponds to the pixel value of the correction target pixel and is extracted from the histogram distribution 404. It is considered that an original distance value of the correction target pixel is close to a distance value of a pixel having a pixel value close to the pixel value of the correction target pixel among pixels around the correction target pixel. Thus, the correction unit 205 limits a range of distance values based on the pixels having the similar pixel values around the correction target pixel and determines a distance value used for replacement in the limited range.

The correction unit 205 obtains the distance value of the pixel having the pixel value similar to that of the correction target pixel from among pixels included in a pixel block having a predetermined size centering on the correction target pixel. The block size is set in advance according to an image size of the image data obtained from the image obtaining unit 201 and the like. For example, according to the present exemplary embodiment, a block size having 1/100 of a lateral size and 1/100 of a longitudinal size of a processing target image is used. Further, the correction unit 205 detects a minimum value d and a maximum value d in the obtained distance values and regards distance values included between the minimum value $d_{min}$ and the maximum value $d_{max}$ as candidates of the distance value used for replacement in the plane 601 corresponding to the pixel value of the correction target. Subsequently, the correction unit 205 replaces the distance value of the correction target pixel with a most frequent distance value among the candidates of the distance value used for replacement. The distance value used for replacement does not always have to be the most frequent distance value, and may be, for example, a weighted average of the top three most frequent distance values according to the frequencies thereof.

Figure 6B:
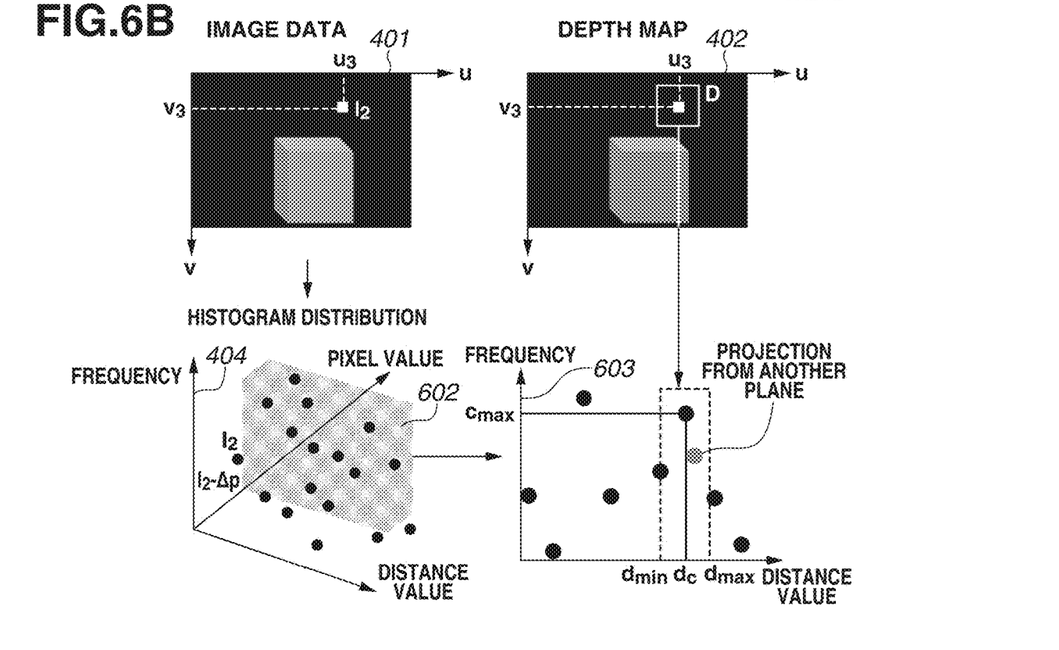

FIG. 6B illustrates an example to allow a predetermined variation of pixel values instead of limiting the candidates of the distance value used for replacement in the plane 601 of the pixel value of the correction target. In FIG. 6B, a set 602 of planes passing through a pixel value $I_2-\Delta p$ to a pixel value $I_2+\Delta p$ centering on the plane 601 is extracted, and an accumulated two-dimensional plane 603 is generated by projecting pair values and count numbers of each plane on the plane 601. Then, in the accumulated two-dimensional plane 603, distance values included between the minimum value $d_{min}$ and the maximum value $d_{max}$ are regarded as replacement candidate distance values, and a distance value dc having the maximum frequency $c_{max}$ in the replacement candidates is regarded as the distance value used for replacement. $\Delta p$ can be determined from a scale of a pixel value and the like and can be set as, for example, $\Delta p=1$. When $\Delta p$ is increased, robustness to a variation of pixel values in the same object can be improved, whereas robustness between objects having similar pixel values is decreased, so that $\Delta p$ may be switched according to a scene.

The replacement method is not limited to the above-described one, and another method can be used. For example, instead of limiting the range of distance values in the histogram distribution in the entire image, a new histogram distribution may be created from only pixels in a peripheral block of the correction target pixel, and a most frequent distance value in the created histogram distribution may be used for replacement. Further, instead of using the most frequent distance value as it is, a plurality of frequent distance values may be detected, and an average of the detected values is used for replacement, or an average of distance values of pixels having similar pixel values included in a peripheral block may be used for replacement. The correction unit 205 outputs the corrected depth map to the image generation unit 207.

In step S307, an orientation obtaining unit 206 obtains position and orientation information including a position and an orientation of a camera capturing each image of the image data obtained from the image obtaining unit 201. The position and orientation information may be any information as long as a positional relationship of each viewpoint can be understood. For example, when processing is performed on image data captured by a plurality of image capturing units of which arrangement is determined in advance, information indicating the arrangement determined in advance is stored in the ROM 103, and the information may be read. In addition, when a multiple viewpoint image is captured by moving a handheld camera, the position and orientation information may be obtained using a position estimation method, such as "structure from motion", using the captured image. The orientation obtaining unit 206 also obtains position and orientation information at a virtual viewpoint corresponding to the image data generated by the image generation unit 207 and outputs all of the obtained position and orientation information pieces to the image generation unit 207.

In step S308, the image generation unit 207 generates virtual viewpoint image data using the image data obtained from the image obtaining unit 201, the corrected depth map obtained from the correction unit 205, and the position and orientation information obtained from the orientation obtaining unit 206.

Figure 7:
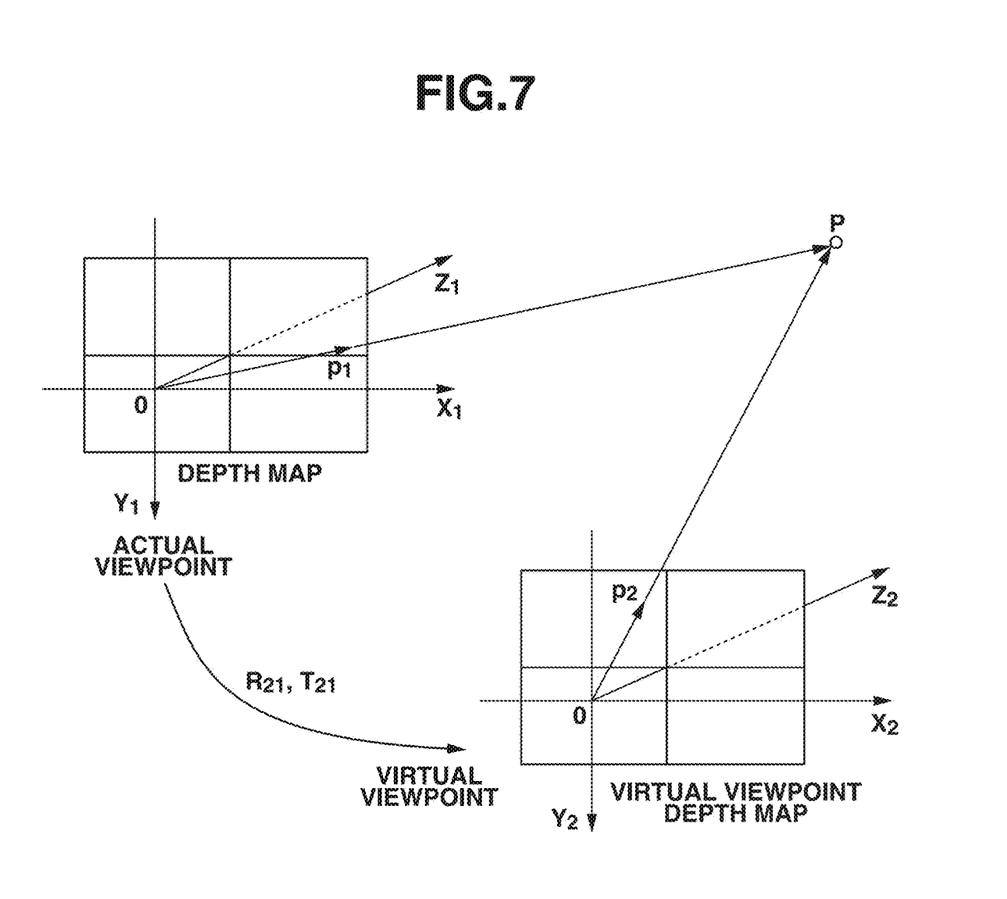
FIG. 7 illustrates a concept of processing by an image generation unit 207 according to the first exemplary embodiment.

According to the present exemplary embodiment, the image generation unit 207 generates a depth map on a virtual viewpoint from the depth map on each viewpoint and then generates the virtual viewpoint image data using the generated depth map. FIG. 7 illustrates a camera coordinate system and a coordinate system of a projection image plane of respective an actual viewpoint at which the image data is captured and a virtual viewpoint. A coordinate origin of an image is a principal point. A camera coordinate system at which an arbitrary image among images included in the image data is captured is regarded as $(X_1, Y_1, Z_1)^T$, and a camera coordinate system of the virtual viewpoint is regarded as $(X_2, Y_2, Z_2)$. When $Z_1$ of a point $P=(X_1, Y_1, Z_1)^T$ in a three-dimensional space projected to an arbitrary point $p_1=(u_1, v_1)$ on the depth map at the actual viewpoint is already known, and a focal distance of the camera is defined as f, X and Y coordinates of the point P in the coordinate system of the actual viewpoint is given by the following equation (1) and equation (2).

$$X_1 = Z_1 u_1/f \quad \text{equation (1)}$$

$$Y_1 = Z_1 v_1/f \quad \text{equation (2)}$$

A relationship between the coordinate system of the actual viewpoint and the coordinate system of the virtual viewpoint can be expressed by an equation (3) using rotation matrix $R_{21}$ and a translation vector $T_{21}$ for converting the position and orientation of the actual viewpoint into the position and orientation of the virtual viewpoint.

$$(X_2, Y_2, Z_2)^T = R_{21}(X_1, Y_1, Z_1)^T + T_{21} \quad \text{equation (3)}$$

The rotation matrix $R_{21}$ and the translation vector $T_{21}$ can be derived based on the position and orientation information input from the orientation obtaining unit 206. $Z_2$ obtained from the equation (3) is a distance value of the point P viewed from the virtual viewpoint, and the point $P=(X_2, Y_2, Z_2)$ is projected to a point $p_2=(u_2, v_2)$ on the depth map at the virtual viewpoint. Here, $(u_2, v_2)$ are calculated by following equation (4) and equation (5) using $X_2$ and $Y_2$ obtained from the equation (3).

$$u_2 = fX_2/Z_2 \quad \text{equation (4)}$$

$$v_2 = fY_2/Z_2 \quad \text{equation (5)}$$

The image generation unit 207 determines a distance value of the point $p_2=(u_2, v_2)$ on the depth map at the virtual viewpoint as $Z_2$.

The image generation unit 207 performs the above described processing on all pixels in the image data and thus generates the depth map with little blank at the virtual viewpoint. When a plurality of distance values from a plurality of viewpoints is assigned to one point on the depth map at the virtual viewpoint, an average value of all of the assigned distance values is determined as the distance value corresponding to the relevant point. The method for determining a distance value is not limited to the above-described one, and a distance value of the actual viewpoint closest to the virtual viewpoint may be adopted, or a distance value may be determined by weighted averaging using a weight corresponding to a distance from the virtual viewpoint. Subsequently, the image generation unit 207 generates image data of the virtual viewpoint according to a correspondence relation of each viewpoint coordinate system using the distance value of the generated depth map at the virtual viewpoint similarly to the processing for generating the depth map of the virtual viewpoint. In other words, the distance value at each pixel position on the generated depth map is substituted into the equation (4) and the equation (5), and derived X, $Y_1$, and $Z_1$ values are substituted into the equation (1) and the equation (2), so that a pixel position of actual viewpoint image corresponding to each pixel of the virtual viewpoint image data is derived. The derived pixel value of the pixel of the actual viewpoint image is determined as a pixel value of a corresponding pixel of the virtual viewpoint image data. The processing is repeatedly performed on all points in the image, so that the virtual viewpoint image data at virtual viewpoint is generated. The method for generating the virtual viewpoint image data is not limited to the above-described one and may be any method using a depth map. For example, an image used for generation of the virtual viewpoint image data may be an image from a single viewpoint, and the virtual viewpoint image data may be generated by shifting each figure of the object in the image captured at the actual viewpoint according to the object distance of each pixel. The image generation unit 207 outputs the generated virtual viewpoint image data to the secondary storage device 104 and the display device 109 and terminates the processing.

Figure 8:
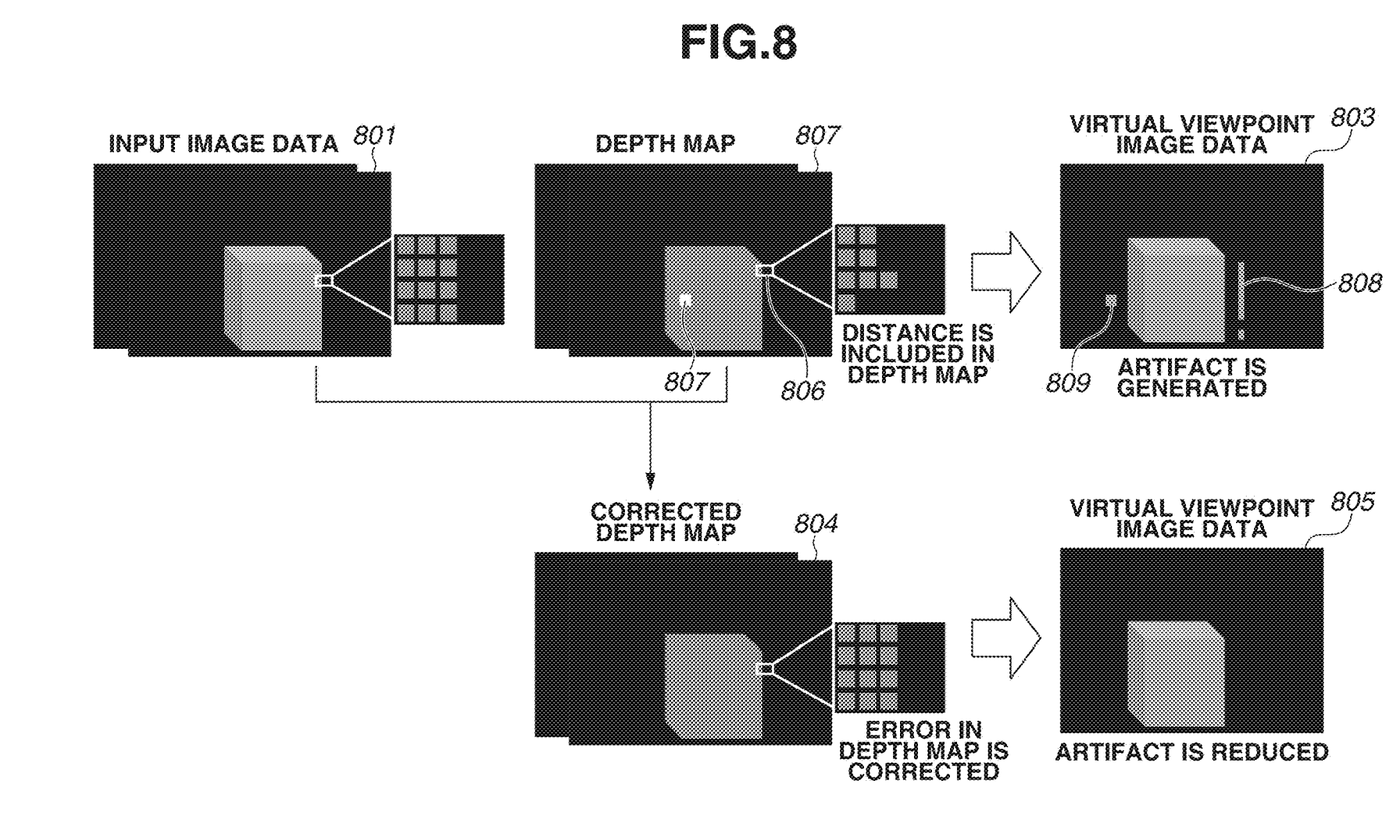
FIG. 8 illustrates a concept of an effect of the first exemplary embodiment.

The processing performed in the processing apparatus 100 according to the first exemplary embodiment has been described above. FIG. 8 is a schematic diagram of an effect according to the processing apparatus 100. In FIG. 8, errors in distance values different from a shape of an object appearing in input image data 801 are generated in a region 806 and a region 807 in a depth map 802. If virtual viewpoint image data is generated using such a depth map, artifacts 808 and 809 are generated in virtual viewpoint image data 803. In contrast, the processing apparatus 100 according to the first exemplary embodiment detects a value deviated from the histogram distribution generated from pair values of pixel values and distance values, and thus a pixel causing an error in the depth map can be detected. Further, the distance value corresponding to the detected pixel is determined based on the range in which peripheral pixel values are similar, so that the error in the depth map is reduced. Accordingly, the depth map 802 is corrected as illustrated in a depth map 804. When the virtual viewpoint image data is generated using the depth map 804, image data in which an artifact is reduced can be obtained as virtual viewpoint image data 805. The processing according to the present exemplary embodiment can correct an error in the depth map occurring in a place like a region 807 which is not a contour portion of the object and thus suppress an artifact 809 in the virtual viewpoint image data 803 caused by the error.

According to the first exemplary embodiment, the image obtaining unit 201 functions as an image obtaining unit configured to obtain image data including an object. The distance obtaining unit 202 functions as a distance obtaining unit configured to obtain distance information indicating an object distance for each pixel of the image data. The determination unit 204 functions as a determination unit configured to determine a correction target pixel subjected to correction of the distance information by comparing a combination of a pixel value and an object distance of each pixel in the image. The correction unit 205 functions as a correction unit configured to correct the distance information of the correction target pixel determined by the determination unit. The histogram generation unit 203 functions as a count unit configured to count a frequency of a pixel value and an object distance of each pixel in the image for each combination of the pixel value and the object distance. The image generation unit 207 functions as a generation unit configured to generate virtual viewpoint image viewed from a viewpoint different from the one of an image obtained by the image obtaining unit using the distance information corrected by the correction unit and the image obtained by the image obtaining unit.

According to the first exemplary embodiment, the example is described in which distance information of each pixel is corrected based on a combination of a pixel value and an object distance of each pixel. According to a second exemplary embodiment, an example is described in which a pixel value of each pixel is corrected based on a combination of a pixel value and an object distance of each pixel.

Figure 10:
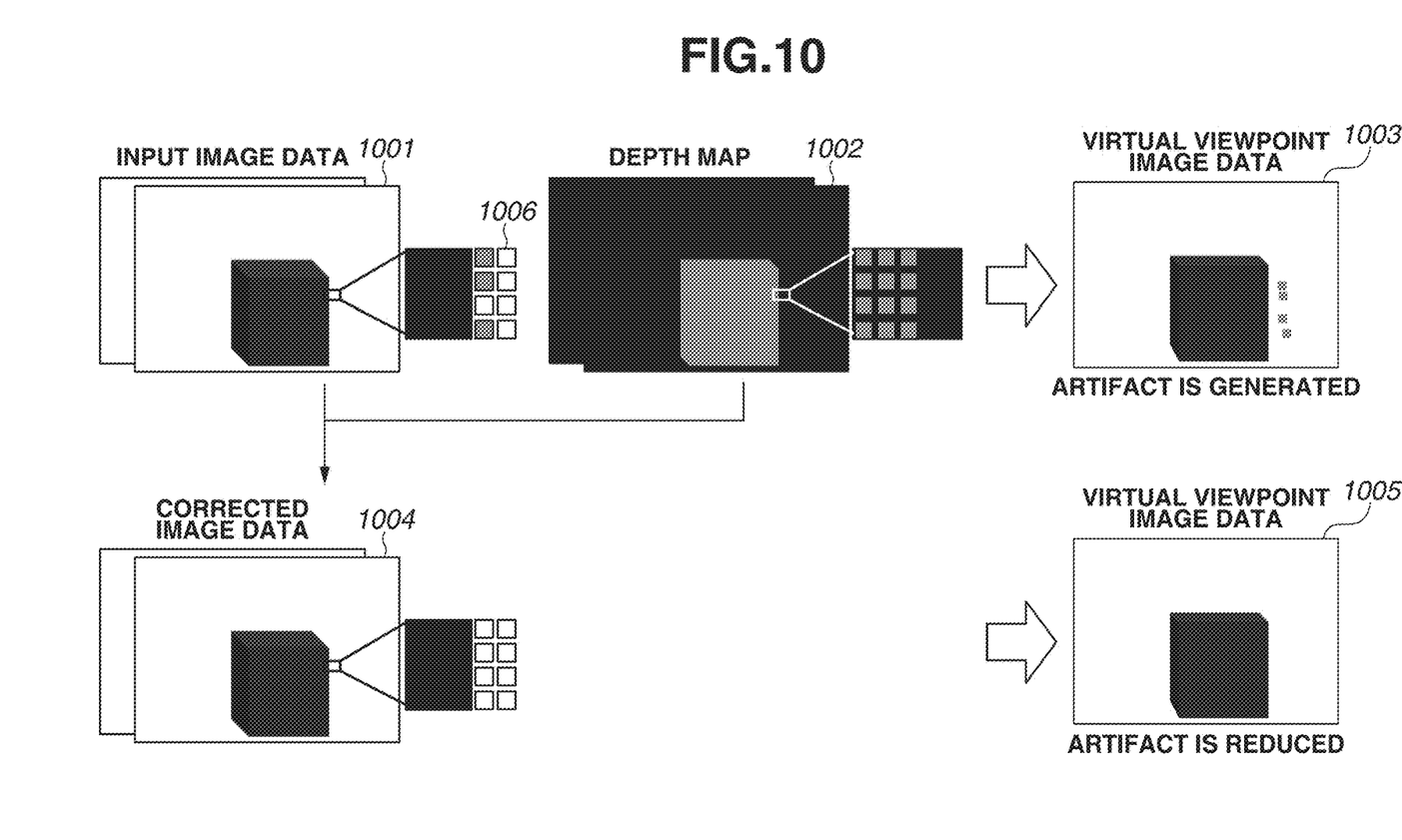
FIG. 10 illustrates a concept of processing executed according to the second exemplary embodiment.

A concept of processing according to the second exemplary embodiment is described with reference to FIG. 10. The processing according to the second exemplary embodiment is premised on that more accurate information is obtained with respect to a depth map rather than input image data. Input image data 1001 illustrated in FIG. 10 includes a region 1006 including an intermediate pixel value between a pixel value of an object and a pixel value of a background at a boundary portion of the object and the background due to an influence of color bleeding and the like. On the other hand, in a depth map 1002 corresponding to the input image data 1001, a distance at the boundary portion of the object and the background is accurately maintained. When virtual viewpoint image data is generated using the input image data 1001 and the depth map 1002, an artifact is generated as illustrated in virtual viewpoint image data 1003. Therefore, according to the present exemplary embodiment, a pixel value of a pixel including an intermediate pixel value is corrected as shown in image data 1004, and the virtual viewpoint image data is generated using the corrected image data.

Specific processing performed in the processing apparatus 100 according to the present exemplary embodiment is described below. A flow of basic processing performed in the processing apparatus 100 according to the present exemplary embodiment is similar to that according to the first exemplary embodiment, and thus different points from the first exemplary embodiment are only described here. According to the present exemplary embodiment, the processing in step S306 is different from the first exemplary embodiment step S306 of the present exemplary embodiment, the correction unit 205 corrects a pixel value of not the depth map but the input image data by replacing a pixel value at the pixel position of the correction target with a pixel value of another pixel. A specific processing method for correcting a pixel value of input image data is described below with reference to FIG. 9.

Figure 9:
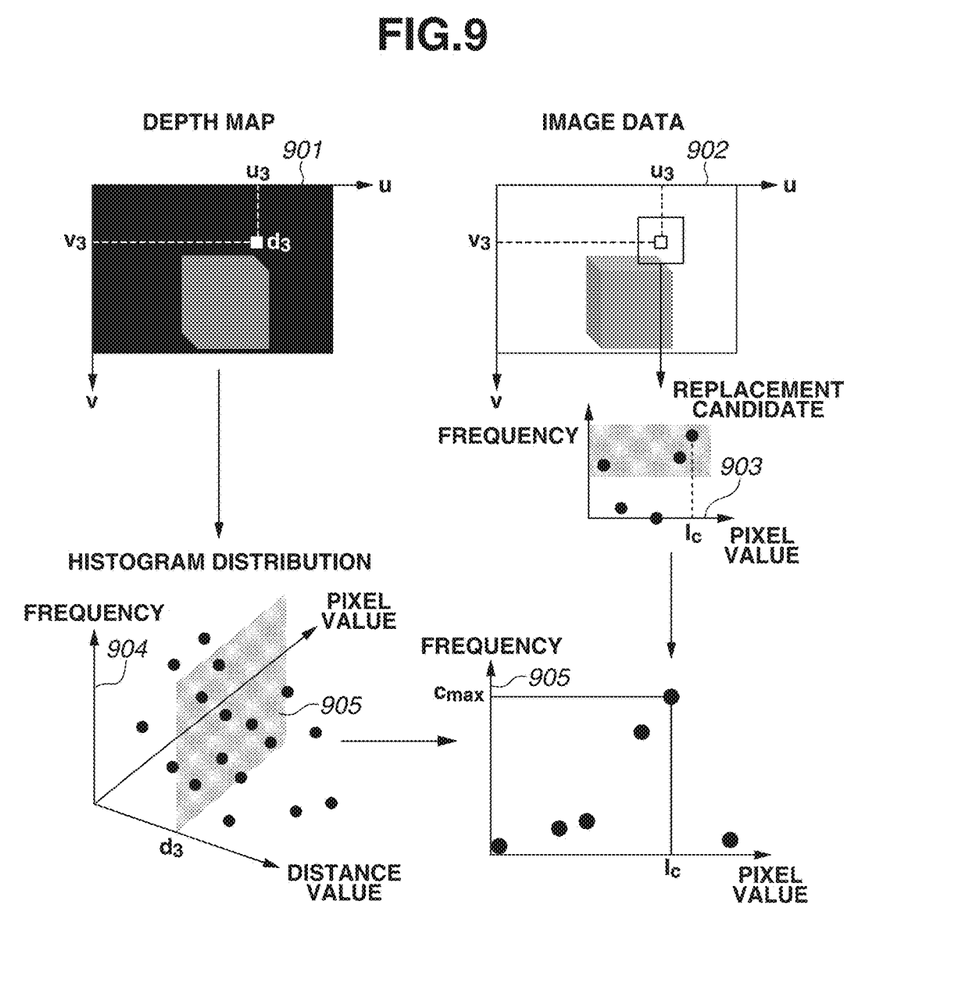
FIG. 9 illustrates a concept of processing by a correction unit 205 according to a second exemplary embodiment.

FIG. 9 illustrates an example to determine a pixel value used for replacement based on a pixel value of a pixel to be the correction target. An original pixel value of the correction target pixel is highly likely to be close to pixel values in a region in which distance values are close to one another among pixels around the correction target pixel. Thus, the correction unit 205 limits candidates of pixel values based on pixels of which distance values are similar to one another around the correction target pixel and determines a pixel value used for replacement from the limited candidates.

The correction unit 205 generates, from pixels included in a block having a predetermined size centering on the correction target pixel, a histogram distribution 903 of pixel values corresponding to the relevant block. Then, the correction unit 205 determines a pixel value which is included in the histogram distribution 903 and a frequency thereof is higher than a predetermined threshold value as a candidate of the pixel value used for replacement. Alternatively, the correction unit 205 may detect a peak value of frequencies in the histogram distribution 903 and determine a pixel value corresponding to the detected peak value as a candidate of the pixel value used for replacement. Next, the correction unit 205 extracts a plane 905 corresponding to the distance value of the correction target pixel from the histogram distribution 904 input from the histogram generation unit 203. Subsequently, the correction unit 205 determines a pixel value which is already determined as the candidate of the pixel value used for replacement based on the block of the peripheral pixels among pixel values included in the plane 905 and the most frequent pixel value among the candidates as the pixel value used for replacement. The correction unit 205 replaces the pixel value of the correction target with the pixel value determined as the pixel value used for replacement and outputs the corrected image data to the image generation unit 207. The image generation unit 207 generates the virtual viewpoint image data by the processing in step S308 using the distance information input from the distance obtaining unit 202 and the corrected image data input from the correction unit 205.

The flow of the processing performed in the processing apparatus 100 according to the present exemplary embodiment has been described above. According to the above described processing, when the distance information which is more accurate than the image data is obtained, high quality virtual viewpoint image data can be generated by maximizing the use of the accuracy of the distance information.

According to the second exemplary embodiment, the determination unit 204 functions as a determination unit configured to determine a correction target pixel subjected to correction of a pixel value of an image by comparing a combination of a pixel value and an object distance of each pixel in the image. The correction unit 205 functions as a correction unit configured to correct the pixel value of the correction target pixel determined by the determination unit. The image generation unit 207 functions as a generation unit configured to generate a virtual viewpoint image viewed from a viewpoint different from the one of an image obtained by the image obtaining unit using the distance information corrected by the correction unit and the image obtained by the image obtaining unit.

Other Embodiments

The exemplary embodiments of the present invention are not limited to the above-described ones. For example, according to the above-described exemplary embodiments, the histogram generation unit 203 counts the frequencies including the combinations of the same pixel values and distance values and generates the histogram distribution, however, the frequency may be integrated by quantizing pixel values and distance values in a wider range. For example, as a frequency of a pair value of I=50 and d=50, the number of pixels of which I=49 to 51 and d=49 to 51 may be counted. Accordingly, robustness is improved with respect to a minute variation in pixel values and distance values. On the other hand, when a quantization range is increased, robustness between objects having similar pixel values is decreased, so that Δp may be switched according to a scene.

Further, according to the above-described exemplary embodiments, a pixel including a pair value of which a frequency is a predetermined threshold value or less is determined as the correction target pixel, however, the method for determining the correction target pixel is not limited to the above-described method. For example, a plurality of representative pair values may be determined in advance as representative pairs based on frequencies of the pair values, a size of a region in which similar pair values continue, and the like, and a pixel which does not include a representative pair of which a difference in pixel value and a difference in distance value both are within threshold values is determined as a correction target.

According to the above-described exemplary embodiments, accuracy of distance information can be improved in a region near a contour of an object and also in a region distant from the contour of the object.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network separate computers or separate processors to read out and execute the computer executable instructions. The computer executable instructions may be provided to the computer, for example, from a network or the storage medium. The storage medium may include, for example, one or more of a hard disk, a random access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is be understood that the invention is not limited to the disclosed exemplary embodiments. The scope of the following claims is to be accorded broadest interpretation so as to encompass all such modifications and equivalent structures and functions.

This application claims the benefit of Japanese Patent Application No. 2015-080440, filed Apr. 9, 2015, which is hereby incorporated by reference herein in its entirety.

What is claimed is:

1. An image processing apparatus comprising:
   an image obtaining unit configured to obtain image data representing an image including an object;
   a distance obtaining unit configured to obtain distance information indicating an object distance from an imaging apparatus capturing the image data to the object for each pixel of the image;
   a determination unit configured to determine a correction target pixel having an abnormal combination of the object distance and a pixel value based on a frequency of combinations of the distance value and the pixel value; and
   a correction unit configured to correct the distance information of the correction target pixel determined by the determination unit.

2. The image processing apparatus according to claim 1, wherein the correction unit corrects the distance information by replacing an object distance of the correction target pixel with a different value.

3. The image processing apparatus according to claim 2, wherein the correction unit replaces the object distance of the correction target pixel with a most frequent object distance among object distances corresponding to pixels of which differences in pixel value with respect to the correction target pixel are equal to or less than a predetermined threshold value.

4. The image processing apparatus according to claim 2, wherein the correction unit limits the object distance used for the replacement based on an object distance of a pixel included in a pixel block having a predetermined size in which the correction target pixel is included.

5. The image processing apparatus according to claim 4, wherein the correction unit extracts object distances of pixels of which differences in pixel value with respect to the correction target pixel are equal to or less than a predetermined threshold value from among pixels included in the pixel block and limits an object distance used for the replacement in a range between a maximum value and a minimum value of the extracted object distances.

6. The image processing apparatus according to claim 1 further comprising a generation unit configured to generate a virtual viewpoint image wherein the determination unit determines a pixel including a combination of a pixel value and an object distance of which a frequency is smaller than a predetermined threshold value as the correction target pixel.

7. The image processing apparatus according to claim 1, wherein the count unit integrates and counts frequencies of a plurality of different pixel values of which differences are equal to or less than a predetermined threshold value.

8. The image processing apparatus according to claim 1, wherein the count unit integrates and counts frequencies of a plurality of different object distances of which differences are equal to or less than a predetermined threshold value.

9. The image processing apparatus according to claim 1, wherein the determination unit determines a plurality of representative pairs which is a representative combination in combinations of a pixel value and an object distance of each pixel in the image and
   determines a pixel of which a difference in pixel value and a difference in object distance both are not equal to or less than a predetermined threshold value with respect to any of the plurality of representative pairs as the correction target pixel.

10. A method for processing an image representing an image, the method comprising:
   obtaining image data including an object;
   obtaining distance information indicating an object distance from an imaging apparatus capturing the image data to the object for each pixel of the image;
   determining a correction target pixel having an abnormal combination of the object distance and a pixel value based on a frequency of combinations of the distance value and the pixel value; and correcting the distance information of the correction target pixel determined.

11. A computer-readable non-transitory storage medium storing a program, the program comprising steps of:
   obtaining image data representing an image including an object;
   obtaining distance information indicating an object distance from an imaging apparatus capturing the image data to the object for each pixel of the image;
   determining a correction target pixel having an abnormal combination of the object distance and a pixel value based on a frequency of combinations of the distance value and the pixel value; and
   correcting the distance information of the correction target pixel determined.

* * * * *